(12) United States Patent
Hampton (10) Patent No.: US 10,490,056 B2
(45) Date of Patent: Nov. 26, 2019

(54) EQUIPMENT MONITORING SYSTEMS AND DEVICES

(71) Applicant: Bently Nevada, LLC, Minden, NV (US)

(72) Inventor: Aaron R. Hampton, Minden, NV (US)

(73) Assignee: Bently Nevada, LLC, Minden, NV (US)

( * ) Notice: Subject to any disclaimer, the term of this patent is extended or adjusted under 35 U.S.C. 154(b) by 0 days.

(21) Appl. No.: 15/809,424

(22) Filed: Nov. 10, 2017

(65) Prior Publication Data

US 2018/0130332 A1 May 10, 2018

Related U.S. Application Data

(60) Provisional application No. 62/420,316, filed on Nov. 10, 2016.

(51) Int. Cl.
*G01H 11/06* (2006.01)
*G08B 21/18* (2006.01)

(52) U.S. Cl.
CPC ................ *G08B 21/187* (2013.01)

(58) Field of Classification Search
CPC .... G08B 21/187; G08B 25/007; G01H 1/003; G05B 19/042; G05B 2219/25165; G05B 2219/25174
See application file for complete search history.

(56) References Cited

U.S. PATENT DOCUMENTS

| 2005/0284226 | A1* | 12/2005 | Boda ...................... G01H 1/003 73/660 |
| 2011/0216658 | A1 | 9/2011 | Etkin et al. |
| 2014/0240688 | A1 | 8/2014 | Fritsch |
| 2014/0257730 | A1* | 9/2014 | Czompo ................ H04L 67/12 702/89 |
| 2015/0131084 | A1 | 5/2015 | Fucile et al. |

(Continued)

OTHER PUBLICATIONS

"Condition Monitoring & Vibration Monitoring," Retrived from the Internet URL: https://www.gemeasurement.com/condition-monitoring-and-protection, on Jun. 1, 2018, pp. 1-6.

(Continued)

*Primary Examiner* — Munear T Akki
(74) *Attorney, Agent, or Firm* — Mintz Levin Cohn Ferris Glovsky and Popeo, P.C.

(57) ABSTRACT

Equipment monitoring employing time-triggered Ethernet communications is provided. Two or more sensor assemblies can be configured to transmit sensor signals representative of one or more operating parameters of a machine to a monitoring system over a token ring Ethernet network. The monitoring system can synchronize timing between the sensor assemblies and schedule timing of respective sensor signal transmissions to bound latency of the scheduled transmissions. Alternatively, or additionally, the monitoring system can include an Ethernet backplane configured to allow Ethernet communication between two or more processing cards coupled thereto. A switch in communication with the Ethernet backplane can schedule transmissions between the processing cards coupled to the Ethernet backplane to guarantee latency of the scheduled transmissions.

11 Claims, 9 Drawing Sheets

(56) References Cited

U.S. PATENT DOCUMENTS

2015/0139198 A1    5/2015   Hwang et al.
2016/0282232 A1*   9/2016   Murphy .................. H04W 4/70

OTHER PUBLICATIONS

"Deterministic Ethernet," Retrived from the Internet URL: https://www.tttech.com/technologies/deterministic-ethernet/, on Jun. 1, 2018, pp. 1-2.

International Search Report and Written Opinion issued in connection with corresponding PCT Application No. PCT/US2017/061023 dated Feb. 9, 2018.

International Preliminary Report on Patentability issued in corresponding International Application No. PCT/US2017/061023, dated May 19, 2019, 7 pages.

* cited by examiner

EQUIPMENT MONITORING SYSTEMS AND DEVICES

CROSS-REFERENCE TO RELATED APPLICATIONS

This application claims the benefit of U.S. Provisional Patent Application No. 62/420,316, filed Nov. 10, 2017, and entitled "Equipment Monitoring Systems and Devices," the entirety of which is hereby incorporated by reference.

BACKGROUND

In industrial environments, machinery can be monitored to ensure that components are operating within acceptable tolerances. In some instances, this monitoring can provide long term benefits such as lower production costs, reduced equipment down time, improved reliability, and/or improved safety.

Vibration is one operating parameter that can be monitored for rotating components of machines such as turbines, engines, and pumps. These rotating components can vibrate during use and the frequency of these vibrations can be correlated to a state of health of the rotating components. As an example, when a rotating component is operating properly, it can produce a characteristic "good" vibration behavior. However, when the rotating component starts to wear, its proper operation (e.g., rotation and alignment) can start to degrade. This degradation can cause a change in the vibration behavior of the rotating component.

SUMMARY

By comparing a current vibration behavior of the component to the "good" vibration behavior, wear of the rotating component can be detected and maintenance on the rotating component can be performed well ahead of breakdown.

In some circumstances, a dedicated channel (e.g., a cable) can be used to transmit sensor data measured by sensors to a central hub that collects sensor values, processes measurements, and transmits statuses to other process systems. However, this manner of communication can be problematic. As an example, noise can be introduced into the sensor data on the cable, which can reduce the quality of the measurement. Since each channel has its own independent cable from the sensor to the central hub, it can also be expensive and time consuming to add channels as each new channel requires additional cabling to be run. Accordingly, devices, systems, and methods are provided for monitoring industrial equipment. Two or more sensor assemblies can be configured to transmit sensor signals representative of one or more operating parameters of a machine to a monitoring system over a token ring Ethernet network. The monitoring system can synchronize timing between the sensor assemblies and schedule timing of respective sensor signal transmissions to bound latency of the scheduled transmissions.

In one embodiment, a system for monitoring a machine is provided and it can include at least two sensor assemblies and a central monitoring system. Each sensor of the at least two sensor assemblies can include a sensor configured to acquire data including measurements of an operating parameter of a machine and a sensor controller configured to transmit a signal representing the measured operating parameter. The signal can be transmitted at a time determined by a timing schedule shared by each of the at least two sensor assemblies. The central monitoring system can be communication with each sensor assembly via a network in a token ring topology. The central monitoring system can also be configured to receive signals transmitted by the at least two sensor assemblies and analyze the received signals to determine at least one status of the machine. Each of the at least two sensor assemblies can be synchronized in time and signals transmitted from each of the at least two sensor assemblies to the central monitoring system according to the timing schedule can have a bounded maximum latency.

In another embodiment, the token ring network can form a single, continuous pathway for transmission of sensor signals from each of the sensor assemblies to the central monitoring system.

In another embodiment, each sensor controller can include at least two Ethernet network controllers and an internet protocol switch and the token ring network can include Ethernet connections between sensor assemblies and the central monitoring system. Each sensor assembly can be connected to either two sensor assemblies that are nearest neighbors within the token ring network or they can be connected to one nearest neighbor sensor assembly and the central monitoring system.

In another embodiment, each sensor assembly can be configured to transmit sensor signals received from a nearest neighbor sensor assembly according to the timing schedule.

In another embodiment, the central monitoring system can be configured to communicate with each of the at least two sensor assemblies via the token ring network for synchronization of time.

In another embodiment, the system can also include at least two first sensor assemblies, at least two second sensor assemblies, and at least two network switches. The at least two first sensor assemblies can be configured to transmit first signals representing a sensed operating parameter of a first machine and they can be in communication with the central monitoring system via a first token ring network. The at least two second sensor assemblies can be configured to transmit second signals representing a sensed operating parameter of a second machine and they can be in communication with the central monitoring system via a second token ring network. The at least two network switches can be configured for communication with the first and second token ring networks such that the first token ring network and the second token ring network are arranged in a tree network topology.

In an embodiment, a system for monitoring a machine is provided and it can include a backplane having a first module, a second module, and a third module. The first module can be in communication with a first processing card. The first processing card can be configured to receive first sensor signals representative of a measured operating parameter of a machine and analyze the first signals to determine at least one first status of the machine. The second module can be in communication with a second processing card. The second processing card can be configured to receive second sensor signals representative of a measured operating parameter of the machine and analyze the second signals to determine at least one second status of the machine. The third module can be configured to receive a third processing card. The third processing card can be configured to synchronize transmission and receipt of communication signals between the first and second processing cards to ensure a bounded maximum latency for transmission of each of the communication signals between the first and second circuit boards.

In another embodiment, the first and second processing cards can be configured to determine the first and second statuses independently of each other.

In another embodiment, failure of one of the first and second processing cards does not interfere with the analysis performed by the other of the first and second processing cards.

In another embodiment, the first module can communicatively couple the first processing card to a first Ethernet network interface controller the second module can communicatively couple the second processing card to a second Ethernet network controller, and the third processing card can include a time triggered Ethernet switch.

In another embodiment, each of the first, second, and third modules can be communicatively coupled to one another by respective Ethernet connections.

In another embodiment, the first processing card and the second processing card do not include a time triggered Ethernet switch.

In another embodiment, the third processing card can synchronizes transmission and receipt of the communication signals by each of the first and second processing cards according to a timing schedule maintained by the third processing card.

Methods for monitoring a machine are provided. In one embodiment, a method can include synchronizing, by a central monitoring system, transmissions from a first sensor assembly and a second sensor assembly to the central monitoring system, according to a timing schedule. The central monitoring system can be communicatively coupled to the first and second sensor assemblies by a token ring network. The method can also include transmitting, by the first sensor assembly, a first signal representing measurements of a first operating parameter of a machine acquired by the first sensor assembly. The first signal can be transmitted at a first time determined by the timing schedule. The method can further include transmitting, by the second sensor assembly, a second signal representing measurements of a second operating parameter of the machine acquired by the second sensor assembly. The second signal can be transmitted at a second time determined by the timing schedule. The method can additionally include receiving, by the central monitoring system, the first and second signals. A latency for transmissions from each of the first and second sensor assemblies to the central monitoring system can be less than a predetermined maximum latency.

In another embodiment, the method can further include analyzing, by the central monitoring system, at least one of the received first and second signals to determine at least one status of the machine.

In another embodiment, the token ring network can form a single, continuous pathway for transmission of the first and second sensor signals from the first and second sensor assemblies, respectively, to the central monitoring system.

In another embodiment, the first sensor assembly and the second sensor assembly can be nearest neighbors within the token ring network.

In another embodiment, the method can further include transmitting, by one of the first and second sensor assemblies, a sensor signal received from the other of the first and second sensor assemblies according to the timing schedule.

In another embodiment, the method can further include, by the central monitoring system, maintaining a clock and communicating time maintained by the clock with each of the first and second sensor assemblies via the token ring network for synchronizing transmission of the first and second signals according to the timing schedule.

BRIEF DESCRIPTION OF THE DRAWINGS

Embodiments of the present disclosure can be more fully understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Various techniques are provided for improved monitoring of machines. As an example, multiple sensors can measure data related to characteristics of a machine, such as vibration, and transmit the data over a computer network to a monitoring system. The monitoring system can receive and process the data to identify equipment problems and/or status of the machine. The monitoring system can also communicate with the sensors to schedule when data is sent by different sensors. As a result, delays between transmission and receipt of the data can kept below a level in a desired range. Scheduling transmissions in this manner can also reduce an amount of wiring between the sensors and the monitoring system and simplify the process of adding additional sensors.

Figure 1:
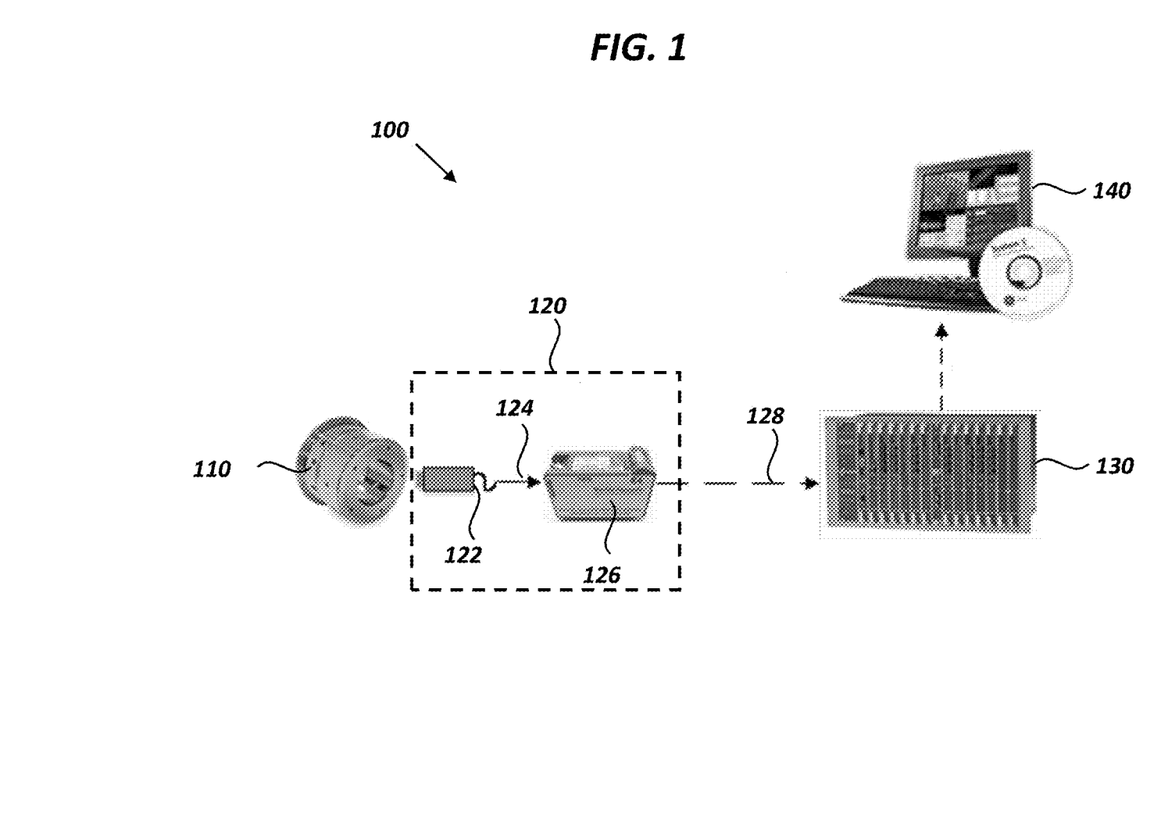
FIG. 1 is a perspective view diagram of an exemplary embodiment of an operating environment showing data flow from a sensor through a monitoring system to diagnostic and analysis software.

FIG. 1 illustrates an operating environment 100 having a single channel for measuring vibration of a machine component 110. As shown, the operating environment 100 can include a sensor 120 coupled to the machine component 110, a monitoring system 130 coupled to the sensor 120, and a computing device 140 coupled to the monitoring system 130. The sensor 120 can be configured to sense an operating parameter (e.g., vibration) of the machine component 110

(e.g., a bearing, a rotating shaft, etc.) and to transmit the sensed operating parameter to the monitoring system 130 in one or more sensor signals. The sensor 120 can be connected to the monitoring system 130 via field wiring 128. The monitoring system 130 can process the sensor signals into separate measurements related to machinery issues, and it can transmit these signals downstream to the computing device 140 and/or to other external system(s). The monitoring system 130 can also or alternatively store sensor signals for later processing. Measurements contained within the sensor signals can be compared against pre-configured setpoints in real time in order to provide automated logic and alarming functionality that annunciates via physical relays on the device or over network or serial protocols to external systems downstream. In an exemplary embodiment, the monitoring system 130 can include, but is not limited to, the 3500 Monitoring System (General Electric Co., of Schenectady, New York).

The sensor 120 can have a variety of configurations, but in an exemplary embodiment the sensor 120 can include a transducer 122 and a signal conditioning circuit 126 that can be coupled to the transducer 122 via a sensor cable 124. The transducer 122 can convert variations in an operating parameter of the machine component 110 into an electrical signal (i.e., the sensor signal). The operating parameter can include, but is not limited to, vibration, velocity, acceleration, temperature, pressure, position, etc. The signal conditioning circuit 126 can condition, amplify, and transmit the sensor signal to the monitoring system 130 via the field wiring 128. In alternative embodiments, the signal conditioning circuit 126 can be omitted and the transducer 122 can be configured to perform the functions of the signal conditioning circuit 126 and directly communicate with the monitoring system 130 via the field wiring 128. In further alternative embodiments, the transducer 122 can include the signal conditioning circuit 126 and sensor cable 124 in a single unit.

Figure 2:
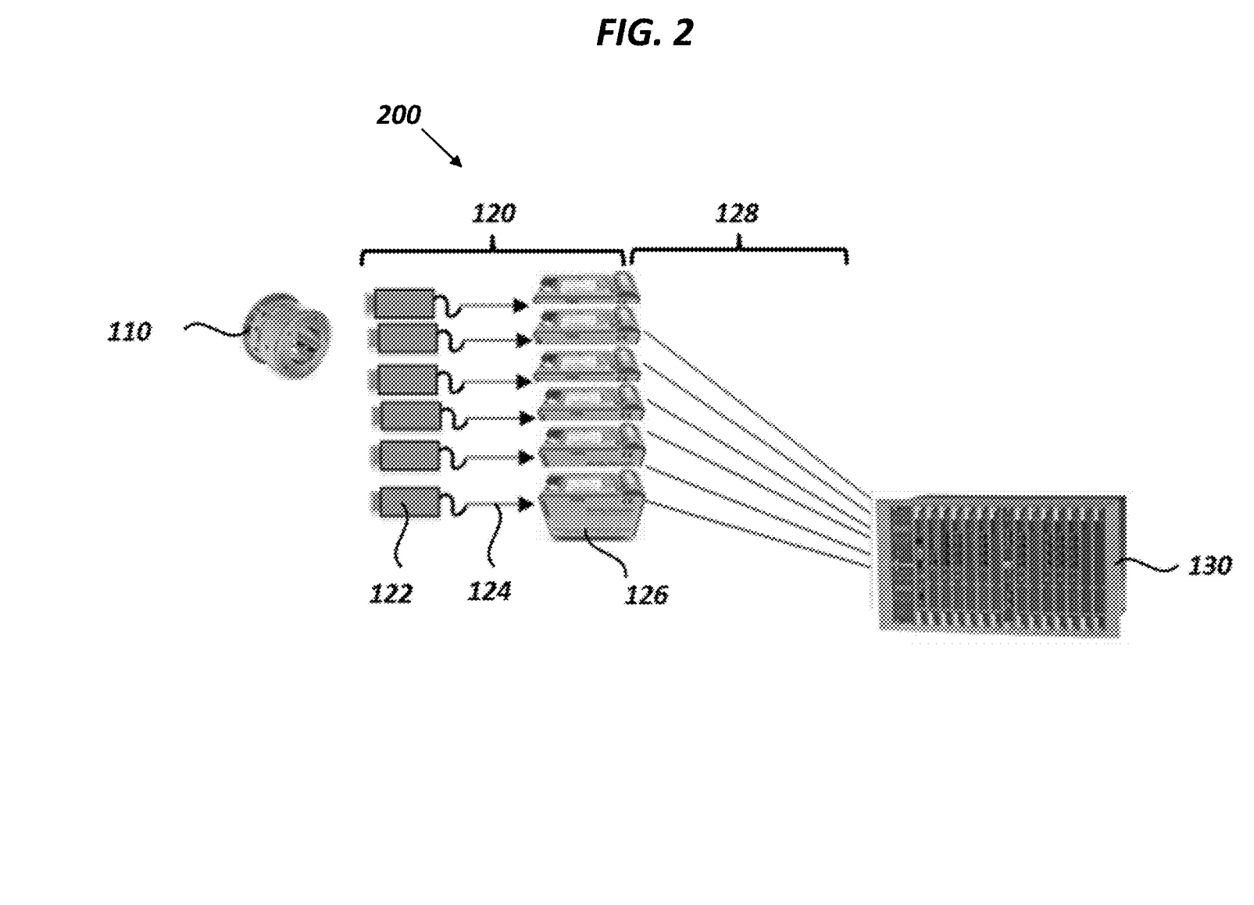
FIG. 2 is a perspective view diagram of an exemplary embodiment of an operating environment having individual wiring between multiple sensors and a monitoring system.

FIG. 2 illustrates an operating environment 200 where the monitoring system 130 can be configured to receive analog sensor signals transmitted from multiple sensors 120, e.g., two to fifty sensors or more, over respective independent field wiring 128 that can span long distances, e.g., up to three hundred meters or more. The received sensor signals can be processed by the monitoring system 130, which can allow for correlating phase across input channels and for determining a speed of the machine.

Figure 3:
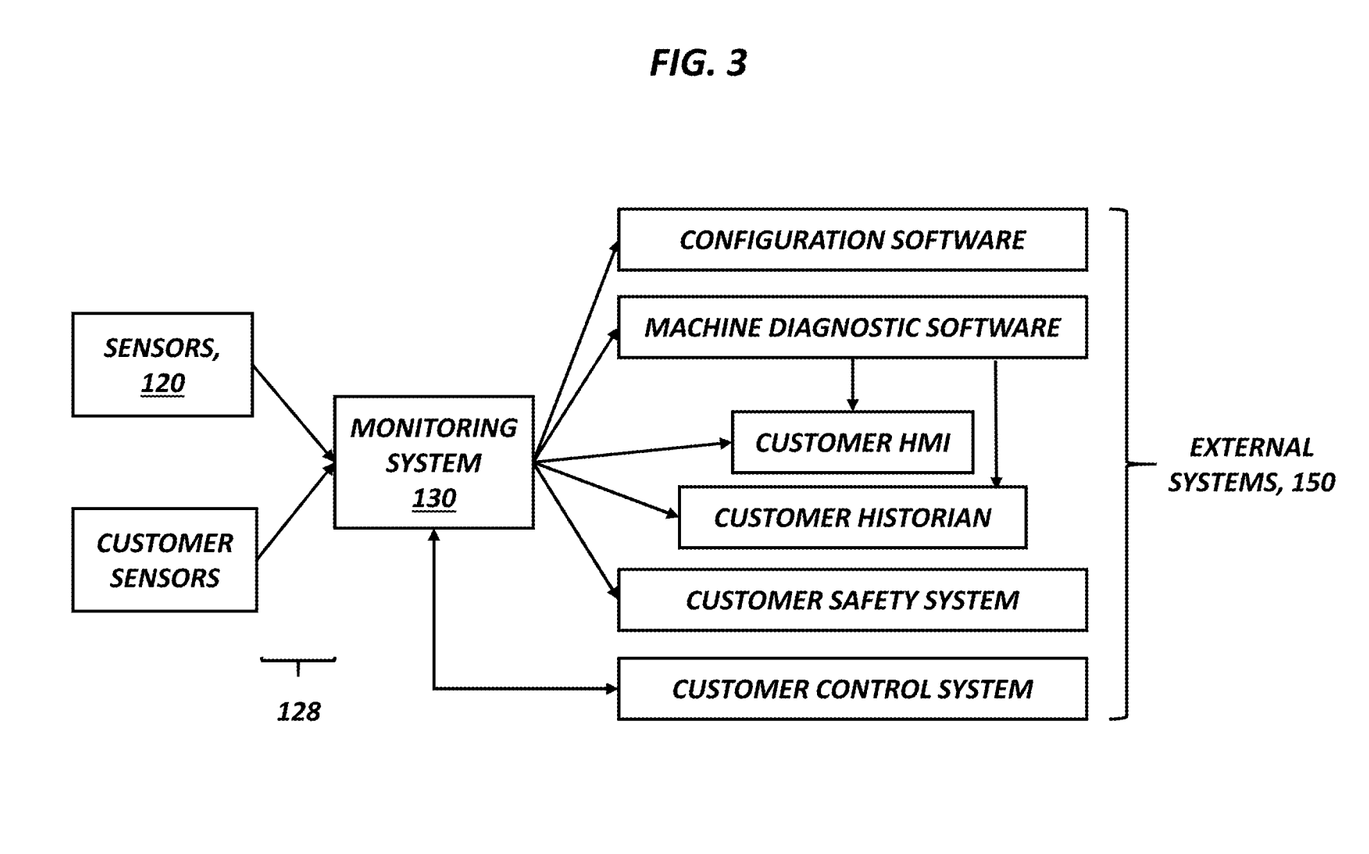
FIG. 3 is a diagram of an exemplary operating environment having multiple external processes and control systems in communication with a monitoring system.

As shown in FIG. 3, the monitoring system 130 can be connected to a variety of external process or control systems (collectively "external systems") 150. The illustrated external systems 150 can include, by way of example, configuration software, machine diagnostic software, customer human-machine interface (HMI), customer historian, customer control system, and customer safety system. Interoperability with the external systems 150 can allow the monitoring system 130 to function as a central hub for collecting sensor signals, processing measurements, and transmitting data and statuses to other process and control systems, which may span multiple plant segments and users.

In some instances, such a configuration can be problematic, however. In one aspect, this configuration can present an inherent cybersecurity risk, since the same monitoring system 130 can need to communicate to multiple network levels. In another aspect, noise can be introduced into the sensor signal during transmission through the field wiring 128, which can reduces the quality of the measurement represented by the sensor signal. Since each channel can have its own independent field wiring from the sensor 120 to the monitoring system 130, scaling and adding channels can require running additional wiring, thus there is little reuse of infrastructure when the customer wishes to add more channels or functionality.

Figure 4:
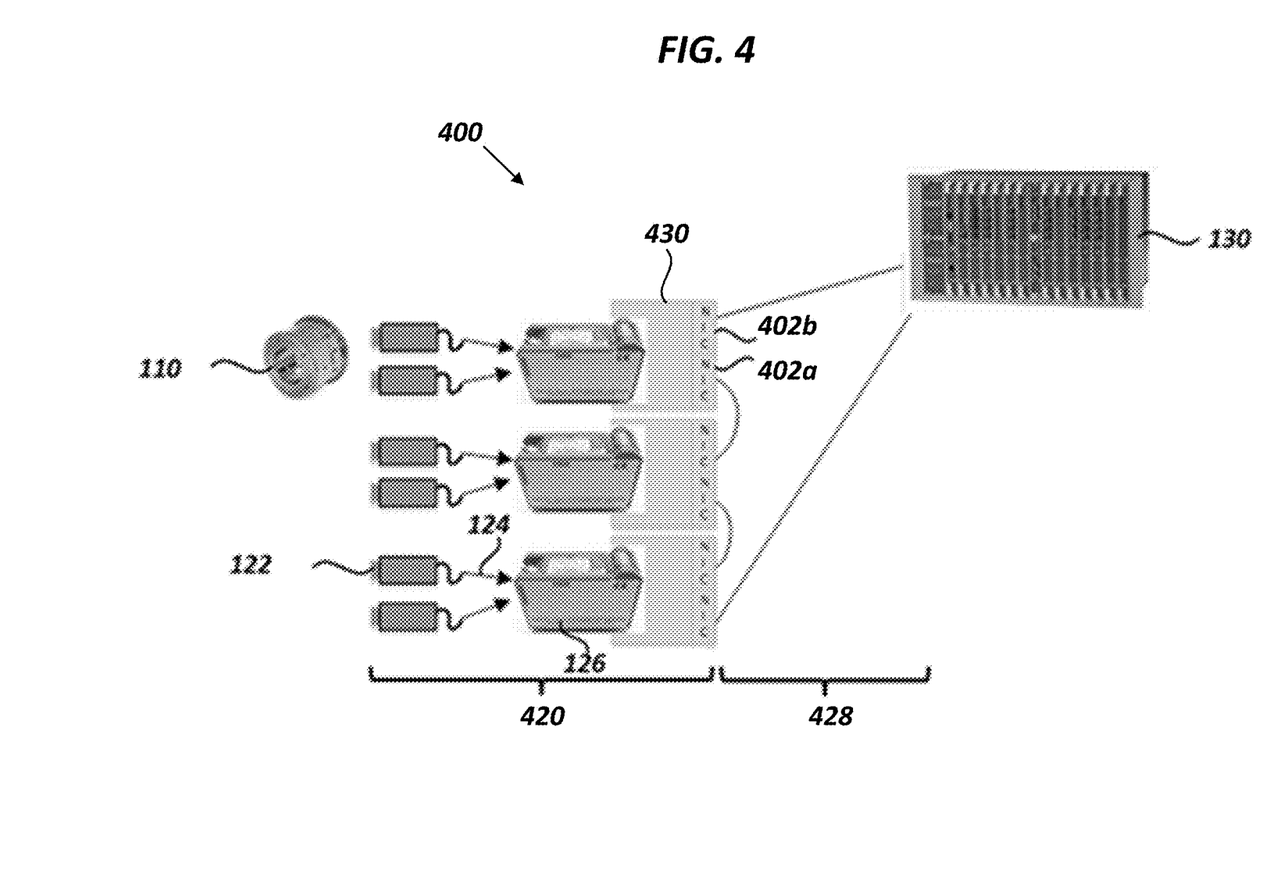
FIG. 4 is a perspective view diagram of an exemplary embodiment of an operating environment having multiple sensors including a sensor controller that enables a token ring network topology configuration between the sensors and a monitoring system.

FIG. 4 illustrates an exemplary embodiment of an operating environment 400 that can have multiple sensors 420 that each can include a sensor controller 430 that enables a token ring network topology configuration between the sensors 420 and the monitoring system 130. The operating environment 400 can employ time-triggered Ethernet (TTE) which can simplify field wiring 428, and/or can enhance communications between processing modules of the monitoring system 130 to ensure that latency is bounded. Furthermore, TTE communications can provide enhanced security against cyber threats and rogue devices.

To implement TTE communication, the operating environment 400 can be modified with respect to the operating environment 200 of FIG. 2. In particular, one or more of the sensors 120 of FIG. 2 can be replaced with TTE sensors 420 (also referred to herein as sensor assemblies), and the field wiring 128 of FIG. 2 can be replaced with the field wiring 428. The TTE sensors 420 can each include a sensor controller 430 that can be configured to receive the analog sensor signal output by their associated signal conditioning circuit 126. Each sensor controller 430 can include two Ethernet network interface controllers (NIC) 432*a*, 432*b* and an internal internet protocol (IP) switch (not shown) to support the token ring network topology.

The NICs 432*a*, 432*b* on each TTE sensor 420 can enable connection via the field wiring 428, such as an Ethernet cable, to a neighboring network element to form the token ring network. In some configurations, the field wiring 428 can include power supply wiring (not shown) for each TTE sensor 420 power supply wiring, separate from the Ethernet cable. In other configurations, power can be supplied to each TTE sensor 420 with Power over Ethernet.

While not shown, in certain aspects, the signal conditioning circuit and the sensor controller can be combined into a single digital signal conditioning circuit, where functions are performed in the digital domain without employing analog components. In either configuration, a single, continuous pathway for transmission of sensor signals from the TTE sensors 420 to the monitoring system 130 can be formed. In the token ring network, each TTE sensor 420 can also function as a hub, transmitting sensor signals received from at least one nearest neighbor network element (e.g., another TTE sensor 420 and/or the central monitoring system 130). In certain embodiments, the token ring network can be unidirectional or bidirectional. As shown in FIG. 4, in the case of two TTE sensors 420, each is connected to the other and to the central monitoring system 130.

The illustrated TTE sensors 420 can be configured such that multiple transducers 122 can communicate with a single signal conditioning circuit 126. In particular, FIG. 4 illustrates TTE sensors 420 that each can include one signal conditioning circuit 126 in communication with two transducers 122. However, each signal conditioning circuit 126 can communicate with only one transducer 122 or with any number of transducers 122, as may be desired.

Communications performed using the TTE sensors 420 and token ring network topology can provide a reduction of field wiring costs. Notably, additional TTE sensors 420 can be placed in communication with the monitoring system 130 without running new wiring 428 from the new TTE sensor to the central monitoring system 130. As an example, TTE sensors added to the token ring network can be connected to two sensor assemblies that are nearest neighbors within the token ring network or connected to one nearest neighbor sensor assembly and the central monitoring system. This is possible because the sensor controller 430 can allow each TTE sensor 420 to operate with the same concept of time (e.g., synchronized in time) with respect to one another. As an example, the central monitoring system 130 can maintain a clock and transmit timing signals to each of the TTE sensors 420 for time synchronization.

At least one of the central monitoring system 130 and each of the TTE sensors 420 can also maintain a timing schedule for transmission of signals from the TTE sensors 420 to the central monitoring system 130. This can allow signals from respective TTE sensors 420 to be scheduled for transmission at different times, regardless of the number of TTE sensors 420 that are present in the token ring network, and for all channels to be correlated relative to that time by the central monitoring system 130. As a result, the maximum latency for transmissions from each of the TTE sensors 420 to the central monitoring system 130 can be bounded (e.g., less than or equal to a predetermined time duration).

Furthermore, the TTE network (e.g., the central monitoring system 130, can detect man-in-the-middle attacks and reject any malformed packet, improving network security and reliability. Additionally, by transmitting sensor signals in the digital domain, more complex information can be sent to the central monitoring system 130 (e.g., a self-identification of each TTE sensor 420) besides the sensor signals. As a result, signal channels can be less susceptible to noise.

Enhanced instrumentation diagnostics and processing and diagnostics at the sensor-level can also be communicated to the monitoring system 130. For example, the addition of digital technology in the TTE sensors 420, combined with the ability to add additional channel data and communications between the TTE sensors 420 and the monitoring system 130, can allow for use of more sophisticated algorithms and sensing methods to compensate for deviations in the measured electrical characteristics of monitored machine components 110. Such a configuration can allow for solutions for electrical and mechanical runout at the sensor-level since the TTE sensors 420 can facilitate detection of off-center rotation of monitored machine components.

Figure 5:
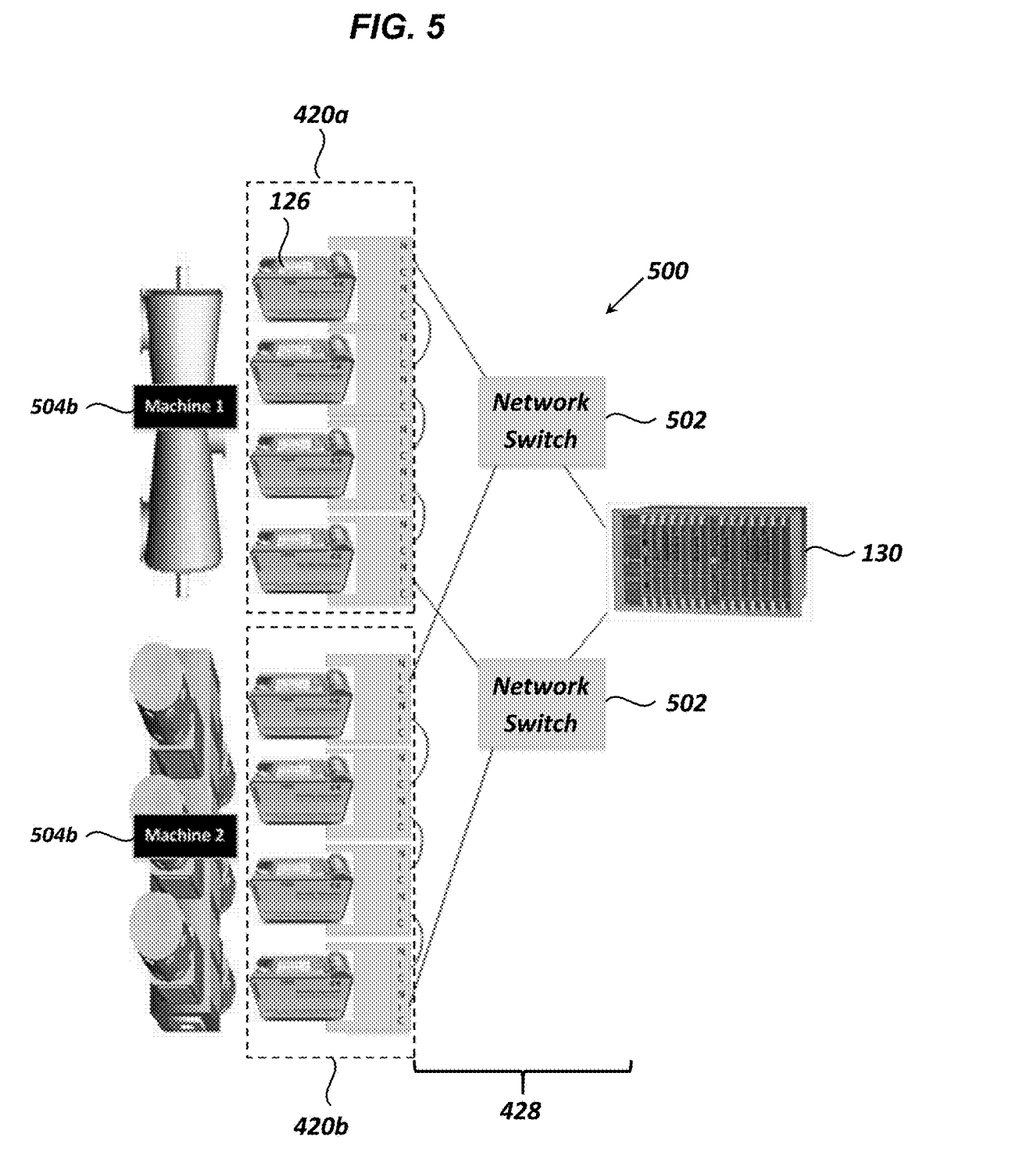
FIG. 5 is a perspective view diagram of an exemplary embodiment of an operating environment having multiple token ring network topologies for communication between a plurality of sensors and a monitoring system.

The token ring network topology of FIG. 4 can be incorporated into a hybrid network topology, as shown in the operating environment 500 of FIG. 5. The hybrid network topology can be employed when the number of TTE sensors 420 is large (e.g., thirty to fifty, or more). In this exemplary embodiment, the operating environment 500 can merge token ring and redundant tree network topologies with active network switches 502. As shown, TTE sensors 420a can be configured to monitor a first machine 504a and they can be arranged in a token ring network topology with the monitoring system 130. Likewise, four TTE sensors 420b can be configured to monitor a second machine 504b and they can be arranged in a token ring network topology with the monitoring system 130. The network switches 502 can enable the token ring networks of each of the first TTE sensors 420a and the TTE sensors 420b to be arranged in a tree network topology, with two trunk communication paths. The network switches 502 can thus direct sensor signals received from the first and second TTE sensors 420a, 420b to the monitoring system 130. Moreover, increased distances between the field wiring 428 and monitored machine components (e.g., the first and second machines 504a, 504b, etc.) can support more complex and sparse customer plants.

Figure 6:
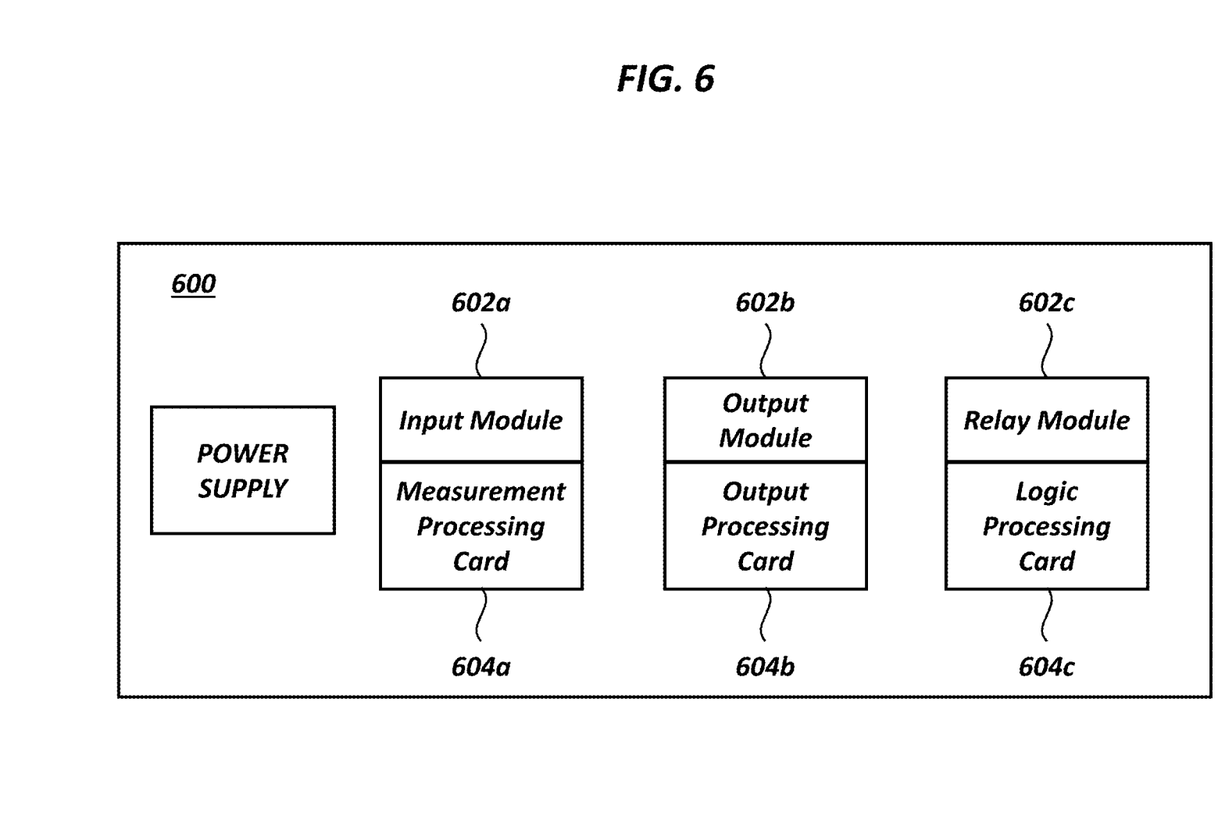
FIG. 6 is a diagram of an exemplary embodiment of a backplane of a monitoring system having sub-systems capable of communication with one another via the backplane.

Exemplary backplane configurations for a monitoring system are also provided. FIG. 6 illustrates an exemplary embodiment of a backplane 600 that can be configured to allow communication between independent processing cards and their associated power supplies. The backplane 600 can include first, second, and third modules 602a, 602b, 602c that are connected to first, second, and third processing cards 604a, 604b, 604c, respectively. The modules 602a, 602b, 602c can provide hardware interfaces and signal conditioning for signals communicated to and from their respective processing cards 604a, 604b, 604c. The individual processing cards 604a, 604b, 604c can communicate on the backplane 600 using protocols running on busses formed from passive traces (not shown) extending across the backplane 600. Various protocols can be used to communicate measurement values, events, states, and configuration information between the processing cards 604a, 604b, 604c. The processing cards 604a, 604b, 604c can each operate and process independently of other processing cards to avoid a single point of failure bringing down the monitoring system. The monitoring system can also include protection circuitry (not shown) isolated from diagnostic and informational circuitry (not shown) to provide further segregation and enhance the robustness in the event of an electrical component failure or user intervention.

Figure 7:
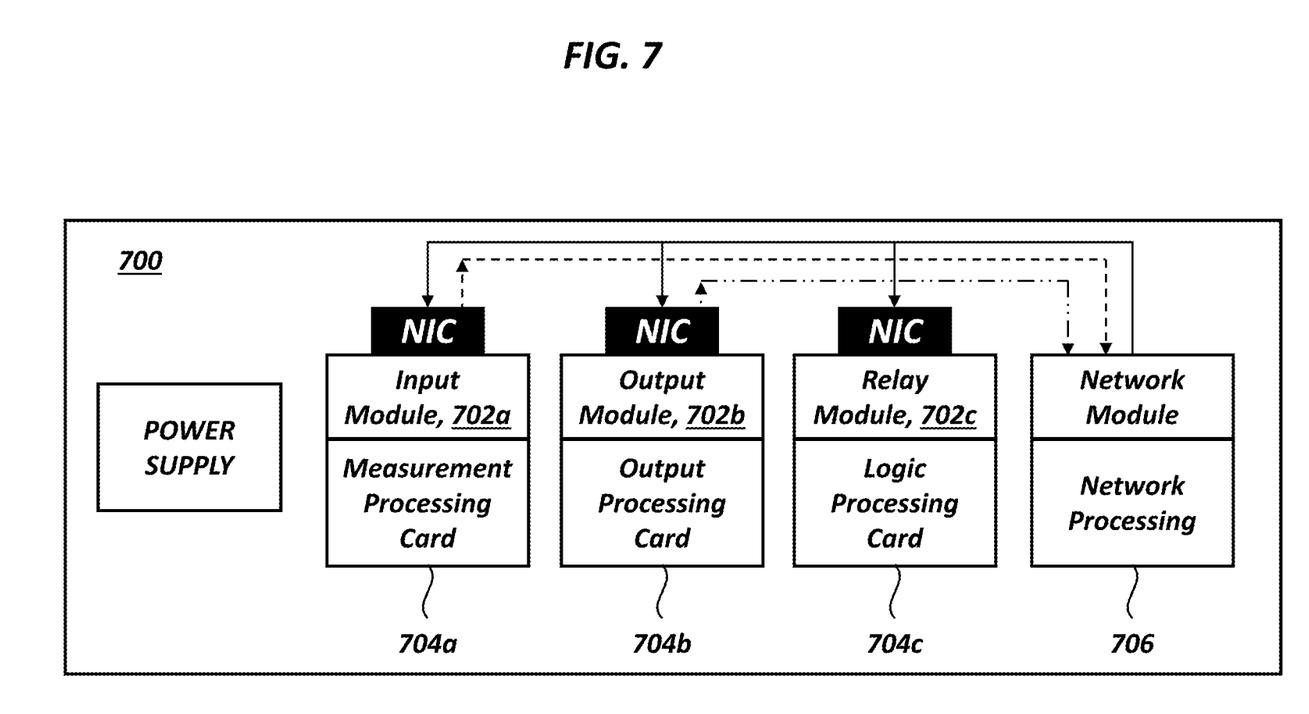
FIG. 7 is a diagram of an exemplary embodiment of an Ethernet backplane of a monitoring system configured to provide Ethernet communication between respective sub-systems.

FIG. 7 illustrates another exemplary embodiment of a backplane 700 that can employ Ethernet such that scalability of a monitoring system can be improved. As shown, the backplane 700 can include first, second, and third modules 702a, 702b, 702c connected to first, second, and third processing cards 704a, 704b, 704c. This configuration and number of processing cards can be dictated by the physical configuration of the backplane 600. The backplane 700 can also include a switch card 706 containing a time triggered Ethernet (TTE) switch. Each processing card 704a, 704b, 704c can include NIC interfaces to reduce cost since no TTE switch is required in the processing cards 704a, 704b, 704c, as this functionality can be provided by the switch card 710. The NIC interfaces can enable the individual processing cards 704a, 704b, 704c to communicate via Ethernet cables 706. In use, the switch card 710 can synchronize time and scheduling between each of the processing cards 704a, 704b, 704c to ensure a bounded maximum latency for scheduled traffic between the processing cards 704a, 704b, 704c. With this networked backplane 700, scalability can increase and the operator can be provided with the opportunity to scale from a low channel count to a higher channel count by using and extending the Ethernet network. While not shown, in other embodiments, the backplane 700 can be physically divided into parts, with each part including respective ones of the modules 702a, 702b, 702c and their respective processing cards 704a, 704b, 704c, allowing for flexibility in physical architecture and configuration.

Figure 8:
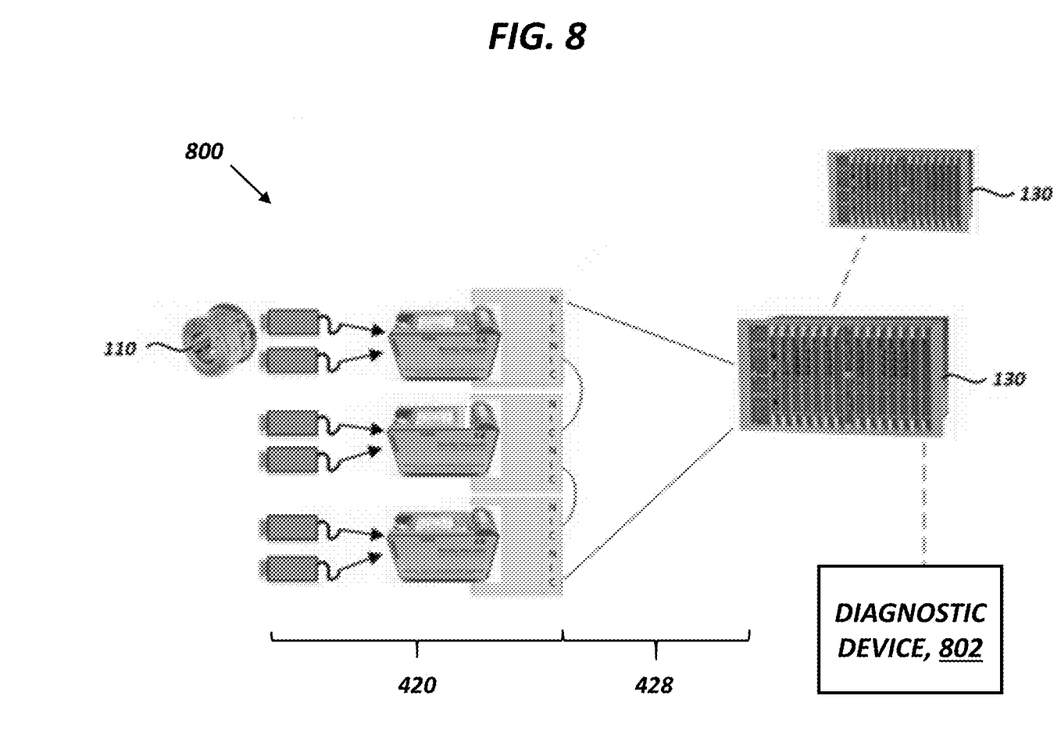
FIG. 8 is a perspective view diagram of an exemplary embodiment of an operating environment including a monitoring system in communication with an external diagnostic device.

The operating environments disclosed herein can enable and enhance communication with an external diagnostic device typically used for temporary diagnostic installations. FIG. 8 illustrates an exemplary embodiment of an operating environment 800 that can have a configuration similar to the operating environment shown in FIG. 4, however the monitoring system 130 of FIG. 8 can be coupled to an external diagnostic device 802. The use of an Ethernet cable for field wiring 428 and a digital signal can enable the re-use of high-resolution samples from the TTE sensors 420 by the external diagnostic device 802, instead of resampling, which may be performed. Since each TTE sensor 420 can have the same concept of time (e.g., be synchronized in time) as the diagnostic device 802, the TTE sensors 420 can stream the digitized data through the field wiring 428 without assigning timestamps. When the diagnostic information is needed by the diagnostic device 802, the diagnostic device 802 can connect to the network, listen for the digitized data, and correlate (for synchronous measurements) using a shared concept of time (e.g., time-sharing) provided by certain time protocols and append additional temporary diagnostic sensor channels to form a unique monitoring system configuration for diagnostic purposes.

Time-sharing or time synchronization can allow multiple users in the network to interact concurrently with the monitoring system 130. Network switches in-between the TTE sensors 420 and the monitoring system 130 can be pre-configured to duplicate the ingress packet to two outgoing ports, one for the normal protection and condition monitoring system, and the other for any diagnostic interface with a need to capture the digitized signal stream. Thus, the temporary installation of a diagnostic device such as diagnostic device 802 avoid the need for reconfiguration, although a specified switch port can be dedicated for diagnostic sensor transmission.

FIG. 6 is a flow diagram illustrating one exemplary embodiment of a method 900 for monitoring a machine (e.g., machine component 110). As shown, the method 900 can include operations 902-910. However, in certain aspects, embodiments of the method 900 can include greater or fewer operations than illustrated in FIG. 9 and its operations can be performed in a different order than illustrated in FIG. 9.

Figure 9:
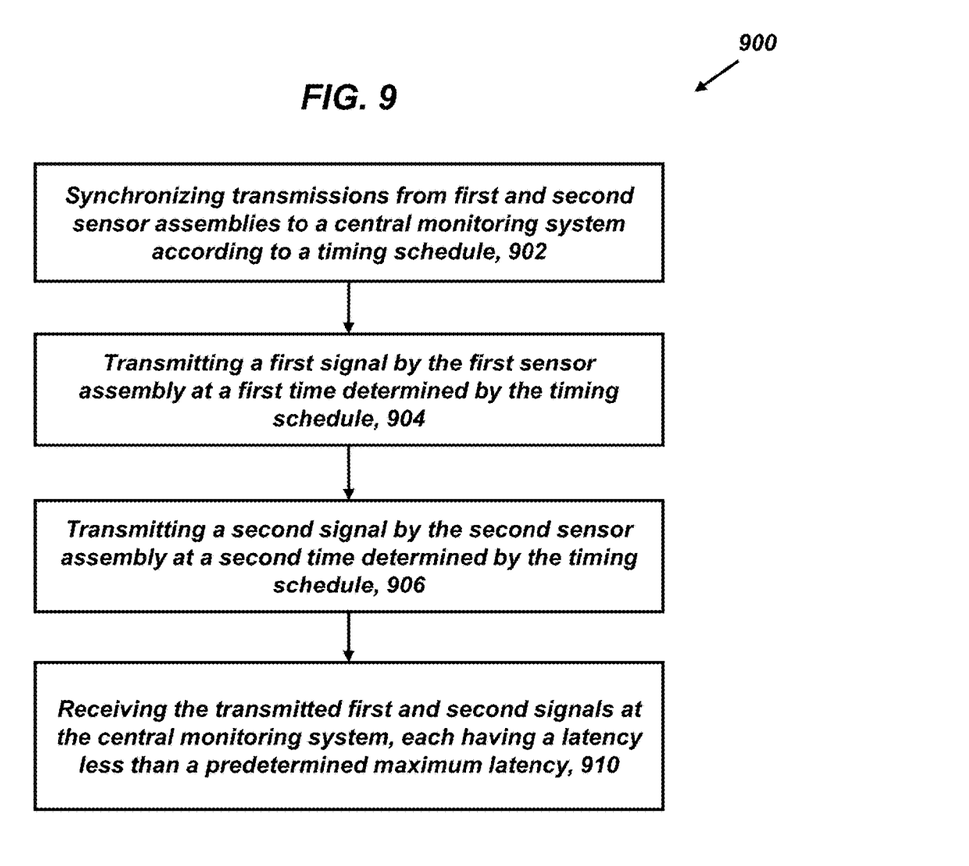
FIG. 9 is a flow diagram illustrating one exemplary embodiment of a method for monitoring a machine.

In operation 902, transmissions from a first sensor assembly and a second sensor assembly (e.g., respective TTE sensors 430) can be synchronized with the central monitoring system 130. As an example, the central monitoring system 130 can be communicatively coupled to the first and second sensor assemblies by a token ring network. The central monitoring system 130 can maintain a clock and communicate time maintained by the clock to each of the first and second sensor assemblies via the token ring network. The central monitoring system 130 can also synchronize transmissions by the first and second sensor assemblies according to a timing schedule that is common to each of the first and second sensor assemblies.

In operation 904, the first sensor assembly can transmit a first signal representing measurements of a first operating parameter of a machine. The first signal can be transmitted at a first time determined by the timing schedule. The measurements contained within the first signal can also be acquired by the first sensor assembly prior to transmission.

In operation 906, the second sensor assembly can transmit a second signal representing measurements of a second operating parameter of a machine. The second signal can be transmitted at a second time determined by the timing schedule. The measurements contained within the second signal can also be acquired by the second sensor assembly prior to transmission.

In operation 910, the central monitoring system 130 can receive the transmitted first and second signals. Owing to the timing schedule, a latency (e.g., time delay) for the first and second signals from each of the first and second sensor assemblies to reach the central monitoring system from the time they are respectively transmitted can be less than a predetermined maximum latency.

In certain embodiments, the central monitoring system can be configured to analyze at least one of the received first and second signals to determine at least one status of the machine. Alternatively, the central monitoring system can further transmit the first and second signals to one or more of the external systems for determining the at least one status of the machine.

Exemplary technical effects of the methods, systems, and devices described herein can include at least one of: (a) reduction in field wiring costs; (b) support for secure transmission of multiple channels with reduced noise susceptibility from sensors to a monitoring system; and (c) flexibility to scale from a low channel count to a higher channel count received by the monitoring system, or to physically separate the monitoring system.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the disclosure based on the above-described embodiments. Accordingly, the invention is not to be limited by what has been particularly shown and described, except as indicated by the appended claims. All publications and references cited herein are expressly incorporated by reference in their entirety.

What is claimed is:

1. A system for monitoring a machine, comprising:
   at least two sensor assemblies, each sensor assembly comprising,
      a sensor configured to acquire data including measurements of an operating parameter of a machine, and
      a sensor controller configured to transmit, at a time determined by a timing schedule shared by each of the at least two sensor assemblies, a signal representing the measured operating parameter; and
   a central monitoring system in communication with each sensor assembly via a network in a token ring topology and configured to:
      receive signals transmitted by the at least two sensor assemblies, and
      analyze the received signals to determine at least one status of the machine,
   wherein each of the at least two sensor assemblies is synchronized in time and signals transmitted from each of the at least two sensor assemblies to the central monitoring system according to the timing schedule have a bounded maximum latency
   wherein each sensor controller comprises at least two Ethernet network controllers and an internet protocol switch and the token ring network comprises Ethernet connections between sensor assemblies and the central monitoring system, wherein each sensor assembly is connected to two sensor assemblies that are nearest neighbors within the token ring network or connected to one nearest neighbor sensor assembly and the central monitoring system.

2. The system of claim 1, wherein the token ring network forms a single, continuous pathway for transmission of sensor signals from each of the sensor assemblies to the central monitoring system.

3. The system of claim 1, wherein each sensor assembly is configured to transmit sensor signals received from a nearest neighbor sensor assembly according to the timing schedule.

4. The system of claim 1, wherein the central monitoring system is further configured to communicate with each of the at least two sensor assemblies via the token ring network for synchronization of time.

5. The system of claim 1, further comprising,
   at least two first sensor assemblies configured to transmit first signals representing a sensed operating parameter of a first machine and in communication with the central monitoring system via a first token ring network;
   at least two second sensor assemblies configured to transmit second signals representing a sensed operating parameter of a second machine and in communication with the central monitoring system via a second token ring network;

at least two network switches configured for communication with the first and second token ring networks such that the first token ring network and the second token ring network are arranged in a tree network topology.

6. A method of monitoring a machine, comprising:

synchronizing, by a central monitoring system, transmissions from at least two sensor assemblies to the central monitoring system according to a timing schedule, wherein the central monitoring system is communicatively coupled to the at least two sensor assemblies by a token ring network;

wherein each of the at least two sensor assemblies comprises at least two Ethernet network controllers and an interne protocol switch and the token ring network comprises Ethernet connections between the at least two sensor assemblies and the central monitoring system, and wherein each of the at least two sensor assemblies is connected to two sensor assemblies that are nearest neighbors within the token ring network or connected to one nearest neighbor sensor assembly and the central monitoring system;

transmitting, by a first sensor assembly of the at least two sensor assemblies, a first signal representing measurements of a first operating parameter of a machine acquired by the first sensor assembly, wherein the first signal is transmitted at a first time determined by the timing schedule;

transmitting, by a second sensor assembly of the at least two sensor assemblies, a second signal representing measurements of a second operating parameter of the machine acquired by the second sensor assembly, wherein the second signal is transmitted at a second time determined by the timing schedule;

receiving, by the central monitoring system, the first and second signals, wherein a latency for transmissions from each of the first and second sensor assemblies to the central monitoring system is less than a predetermined maximum latency.

7. The method of claim 6, further comprising analyzing, by the central monitoring system, at least one of the received first and second signals to determine at least one status of the machine.

8. The method of claim 6, wherein the token ring network forms a single, continuous pathway for transmission of the first and second sensor signals from the first and second sensor assemblies, respectively, to the central monitoring system.

9. The method of claim 6, wherein the first sensor assembly and the second sensor assembly are nearest neighbors within the token ring network.

10. The method of claim 9, further comprising transmitting, by one of the first and second sensor assemblies, a sensor signal received from the other of the first and second sensor assemblies according to the timing schedule.

11. The method of claim 6, further comprising, by the central monitoring system, maintaining a clock and communicating time maintained by the clock with each of the first and second sensor assemblies via the token ring network for synchronizing transmission of the first and second signals according to the timing schedule.

* * * * *